United States Patent [19]

Leiber

[11] Patent Number: 5,010,793
[45] Date of Patent: Apr. 30, 1991

[54] MACHINING APPARATUS FOR PRECISE TURNING OF AN OUTSIDE SURFACE

[75] Inventor: Hans J. Leiber, Tramelan, Switzerland

[73] Assignee: Kummer Freres SA Fabrique de machines, Tramelan, Switzerland

[21] Appl. No.: 346,464

[22] Filed: May 2, 1989

[30] Foreign Application Priority Data

May 10, 1988 [CH] Switzerland .......... 1780/88

[51] Int. Cl.$^5$ .............................................. B23B 3/28
[52] U.S. Cl. .......................................... 82/19; 82/18; 82/11
[58] Field of Search .................... 82/19, 18, 11, 11.1, 82/11.2

[56] References Cited

U.S. PATENT DOCUMENTS

| | | | |
|---|---|---|---|
| 4,552,045 | 11/1985 | Inoue et al. | 82/19 |
| 4,584,915 | 4/1986 | Ichiyanagi et al. | 82/19 |
| 4,584,916 | 4/1986 | Inoue et al. | 82/19 |
| 4,887,500 | 12/1989 | Leiber et al. | 82/18 |

FOREIGN PATENT DOCUMENTS 0287519 10/1988 European Pat. Off. .
50-145986 11/1975 Japan .

Primary Examiner—Frederick R. Schmidt
Assistant Examiner—Lawrence Cruz
Attorney, Agent, or Firm—Oliff & Berridge

[57] ABSTRACT

A workpiece (1) is fixed by means of a chuck (4) and rotates with a spindle (3) in a headstock (2). A first cam (30) is fixed to the main shaft of the spindle. Its control surface guides a feeler roller (31). A rotary pulse generator (8) is actuated by the rotation of the spindle shaft. An auxiliary motor (10) is disposed on a cross-slide (12) and causes an auxiliary shaft (21) to rotate. The pulse generator produces synchronization between the spindle shaft and the auxiliary shaft. The latter bears a second cam. According to the position of the cross-slide, the exact location of teh tools (16, 17) is determined by the first cam or by the second.

6 Claims, 1 Drawing Sheet high acceleration and deceleration values

MACHINING APPARATUS FOR PRECISE TURNING OF AN OUTSIDE SURFACE

This invention relates to machining equipment, and more particularly to an auxiliary apparatus for the precision turning of a lateral surface of a workpiece fixed in a spindle of a machine, of the type having a base intended to be fixed on a cross-slide of this machine, a slide movable in a predetermined direction relative to the base against the action of elastic means, means for fixing several turning tools, integral with the slide, and a cam control comprising at least one cam driven rotatingly synchronously with the spindle, this control ensuring displacements of the tools, in the course of which each of them machines a portion of the mentioned surface.

Apparatus of this kind has already been disclosed, especially in Japanese publication No. 50-145,986. European Patent Application No. 88810239.9 of Apr. 14, 1988 (not published at the priority date of the present application) likewise relates to apparatus of the same kind.

Such apparatus is specially designed for the efficient machining of parts such as the drums which bear recording tapes for VCRs, as well as for digital cassette recorders. A drum of this kind is shown in FIG. 1.

Prior art apparatus of this type is generally satisfactory. In most cases it can be used for machining economically and with the requisite precision the variable-height shoulder which the outer surface of the drum must include. The curve of this shoulder is defined by a cam. In particular, when this shoulder has the curve shown in FIG. 1B, i.e., a continuous curve so that the accelerations and decelerations are of limited value, the prior art devices are quite suitable.

However, there are cases where the profile of the shoulders has abrupt modifications which create significant deviations of acceleration and deceleration (see FIG. 1C).

The machining of such parts with prior art apparatus requires working at a reduced speed, hence under not very economical conditions.

It is an object of this invention to provide improved apparatus for the precision turning of a lateral surface by means of which workpieces such as those of FIGS. 1 and 1C may be machined economically.

To this end, in the auxiliary apparatus according to the present invention, of the type initially mentioned, the cam control comprises several synchronously driven cams, each having a guide surface, and several transmission components mounted on the slide and each intended to co-operate with one of the cams, the guide surface of the cams and the transmission components being arranged so that the transmission components can be brought successively, by displacements of the cross-slide, into bearing positions in which they rest against the guide surface of the cam to which they correspond, against the action of the mentioned elastic means, so as to control displacements of the slide.

A preferred embodiment of the invention will now be described in detail with reference to the accompanying drawings, in which.

Figure 1:
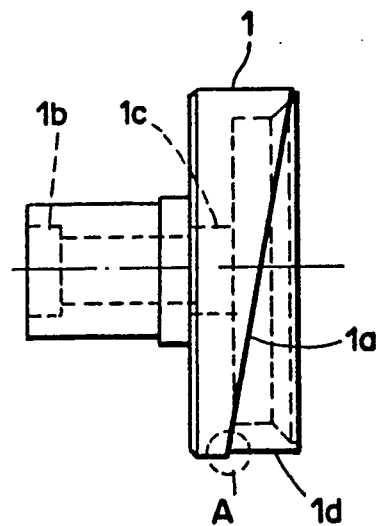
FIG. 1 is an elevation of the drum to be machined.
Figure 1A:
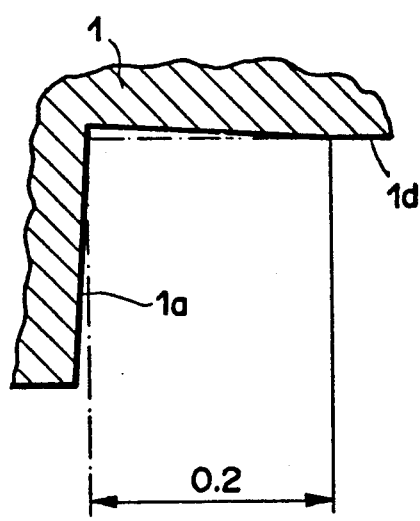
FIG. 1A is a detail on a larger scale of zone A of FIG. 1.
Figure 1B:
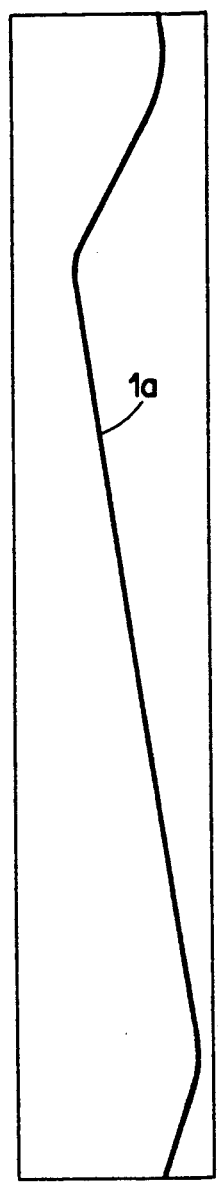
Figure 1C:
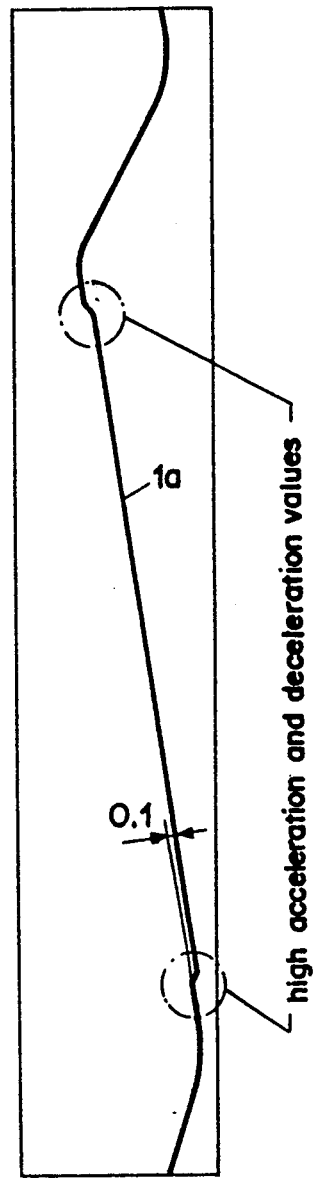
Figure 2:
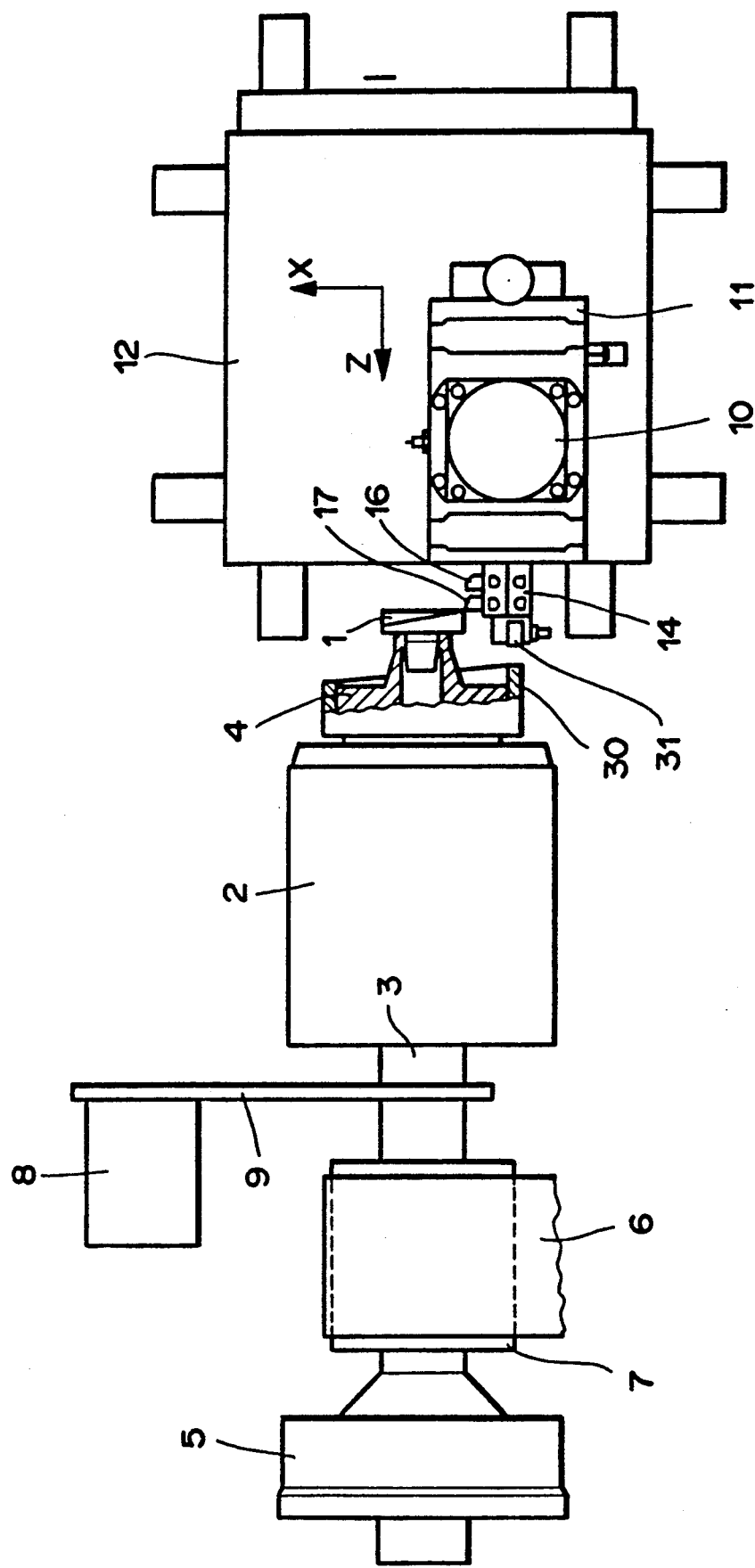
Figure 3:
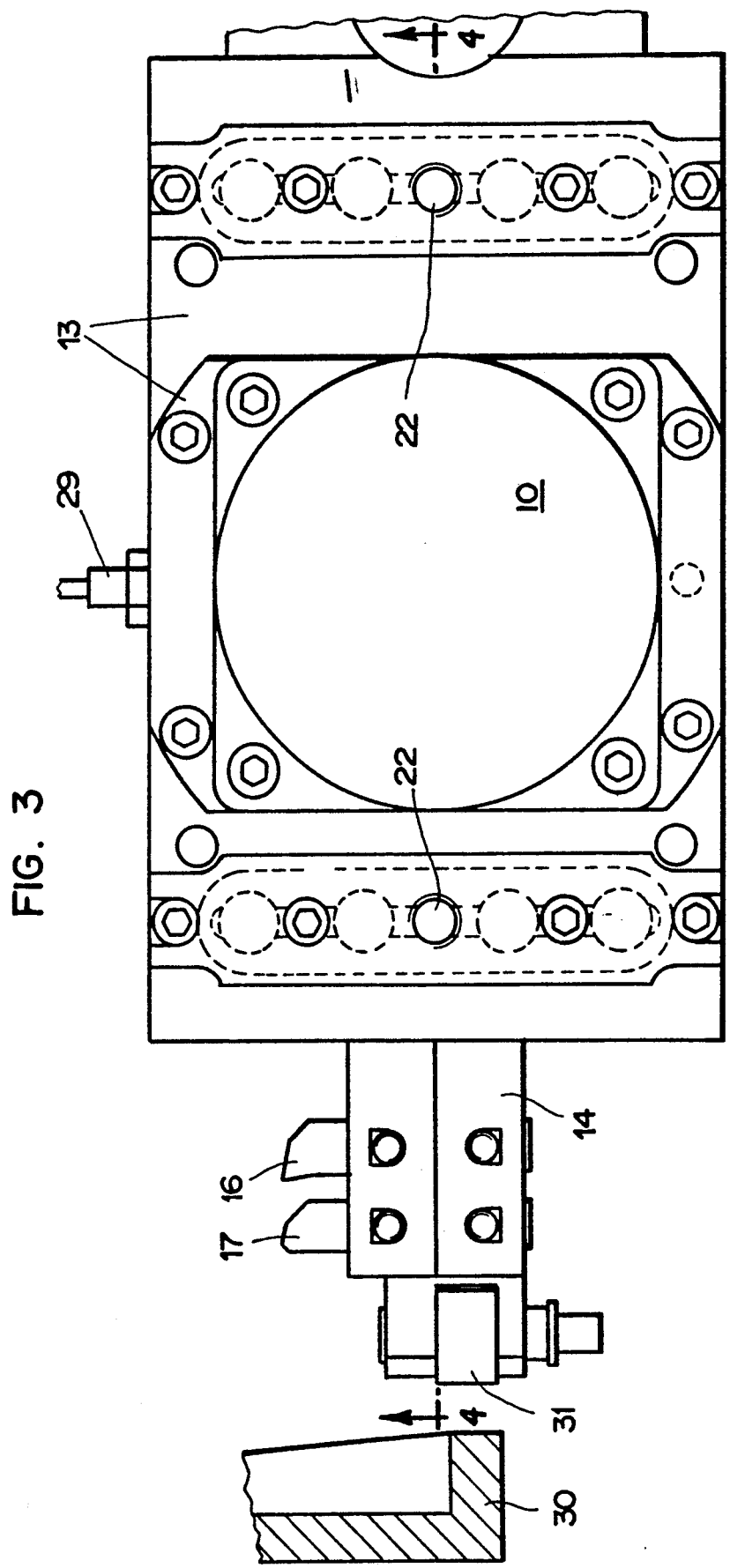
Figure 4:
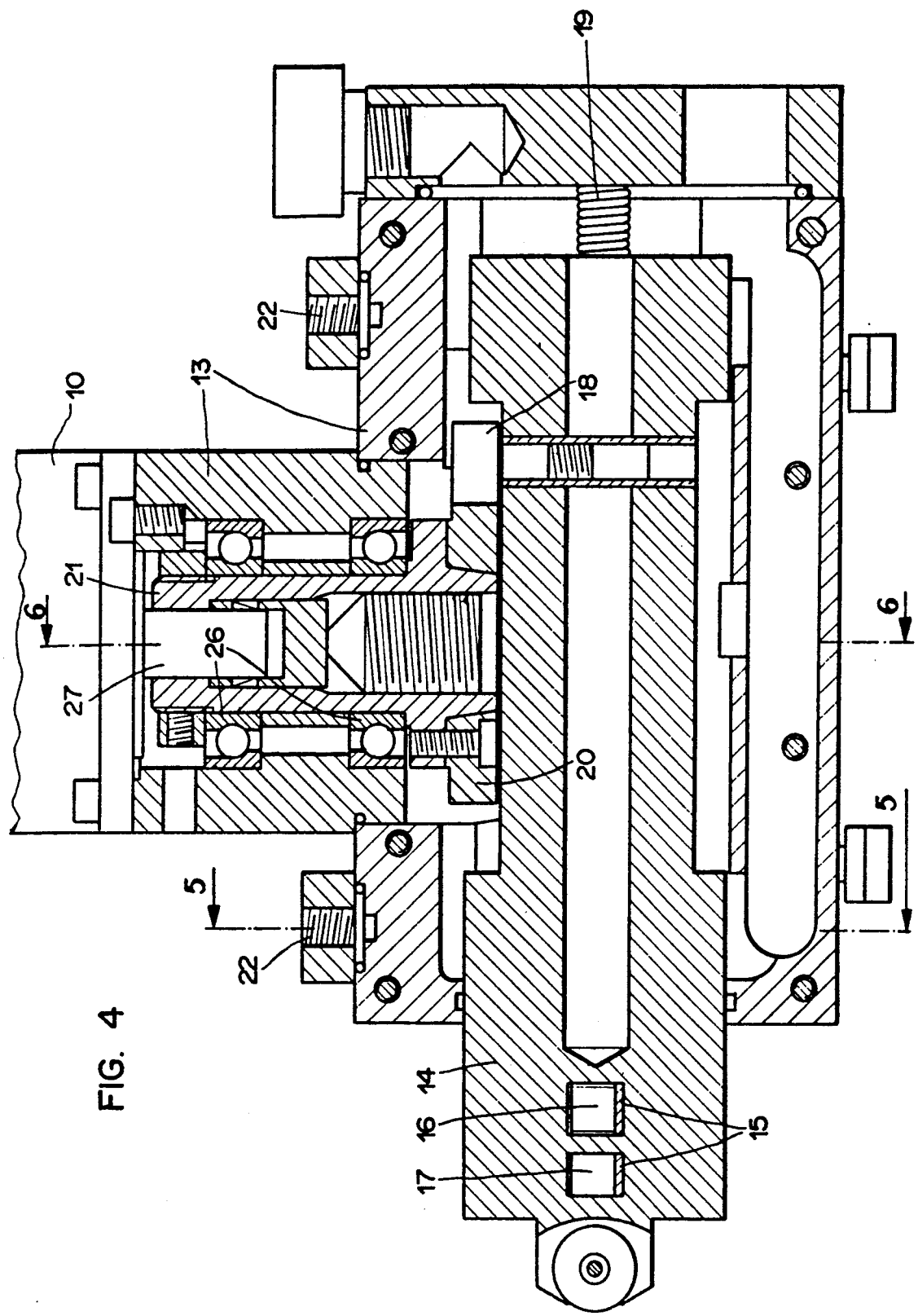
Figure 6:
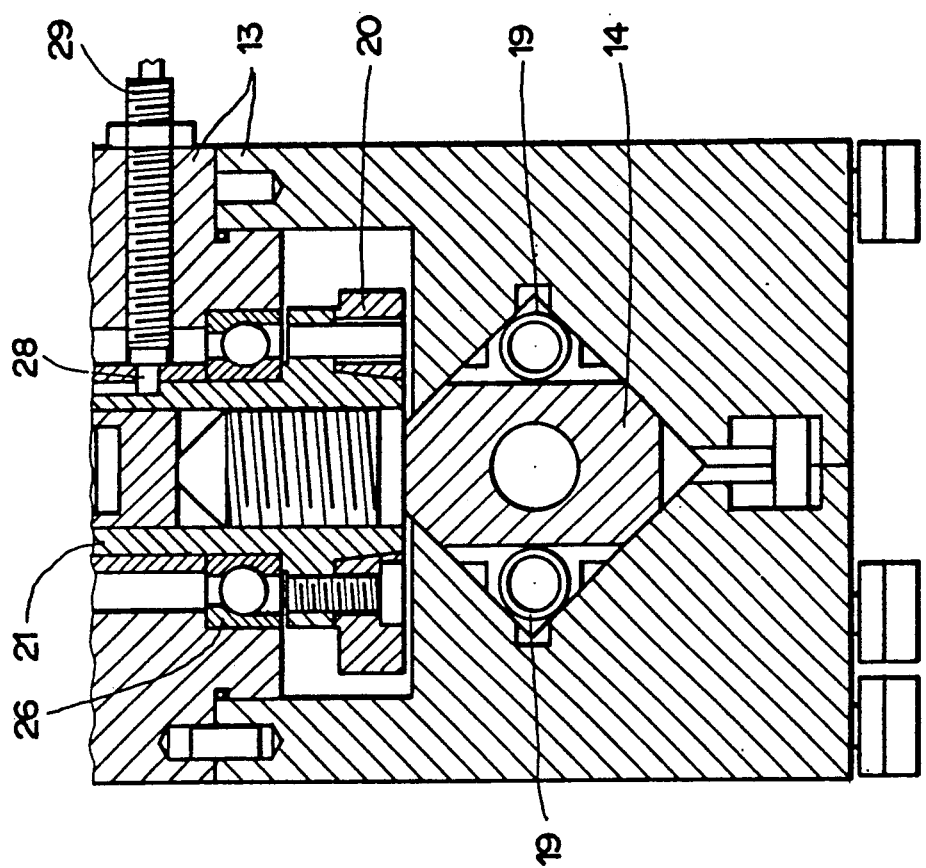
Figure 5:
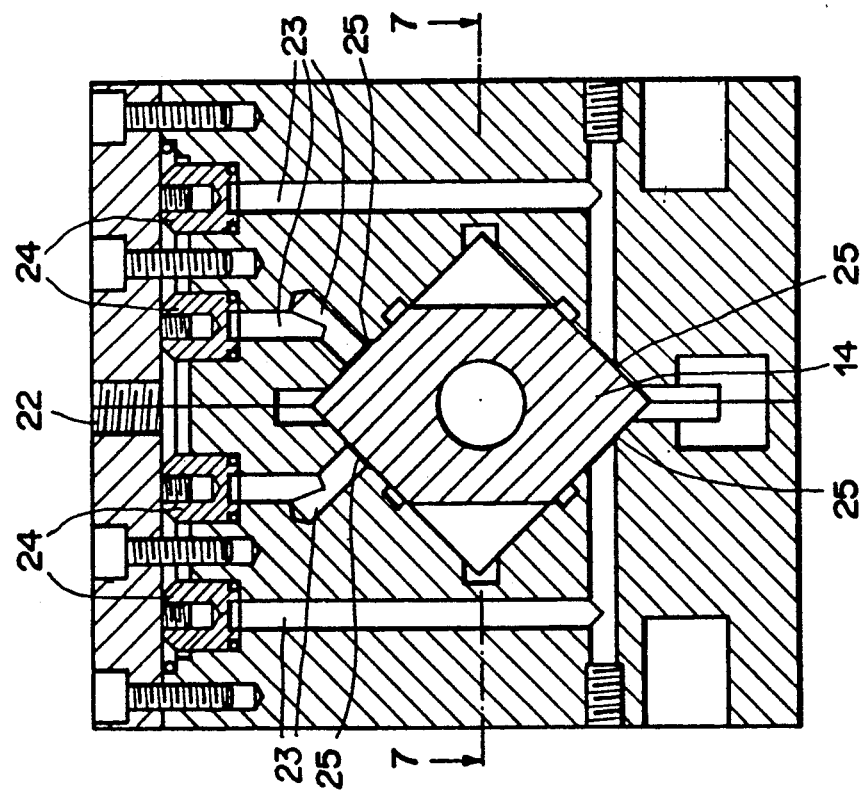
Figure 7:
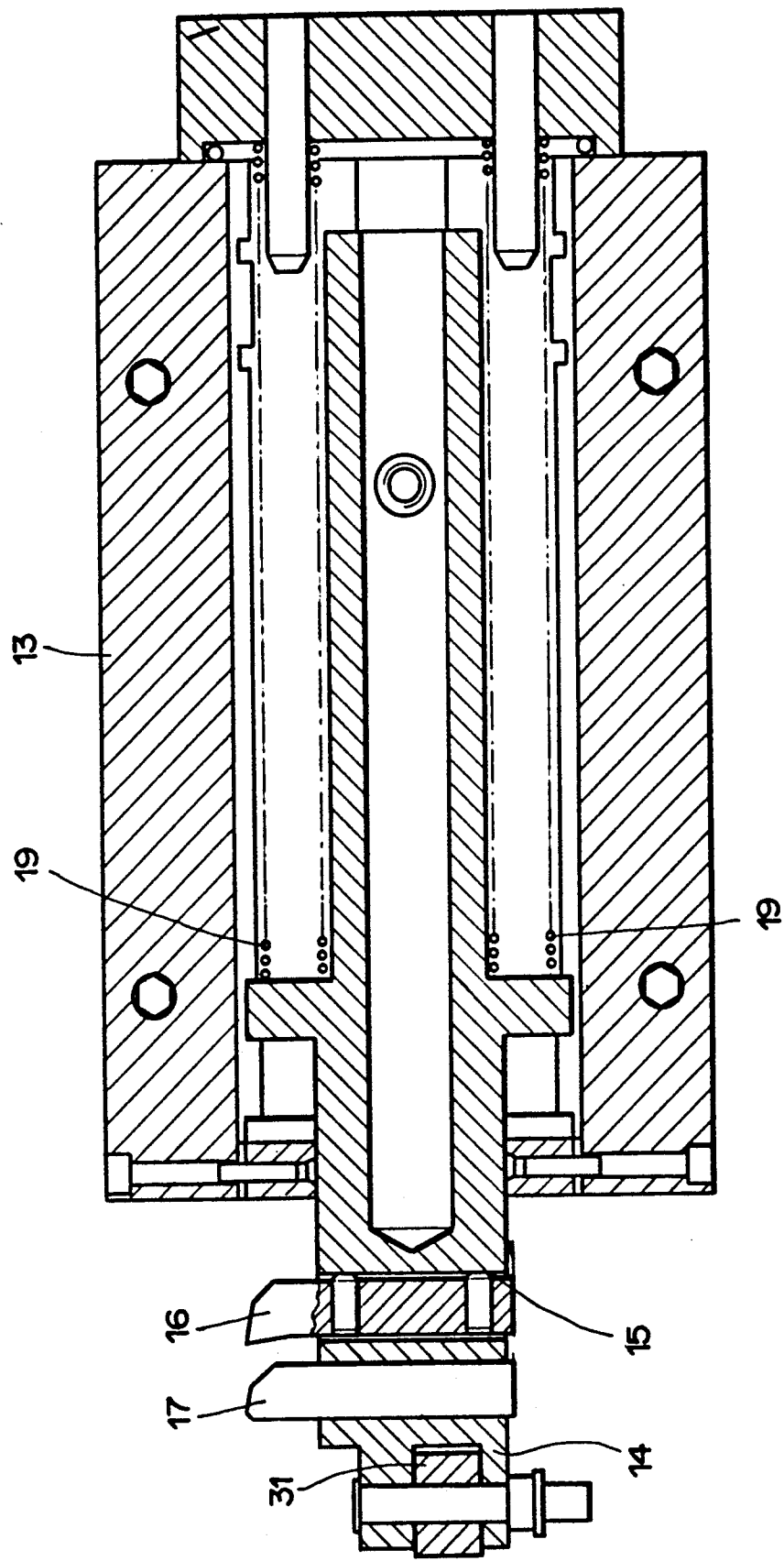
Figure 8:
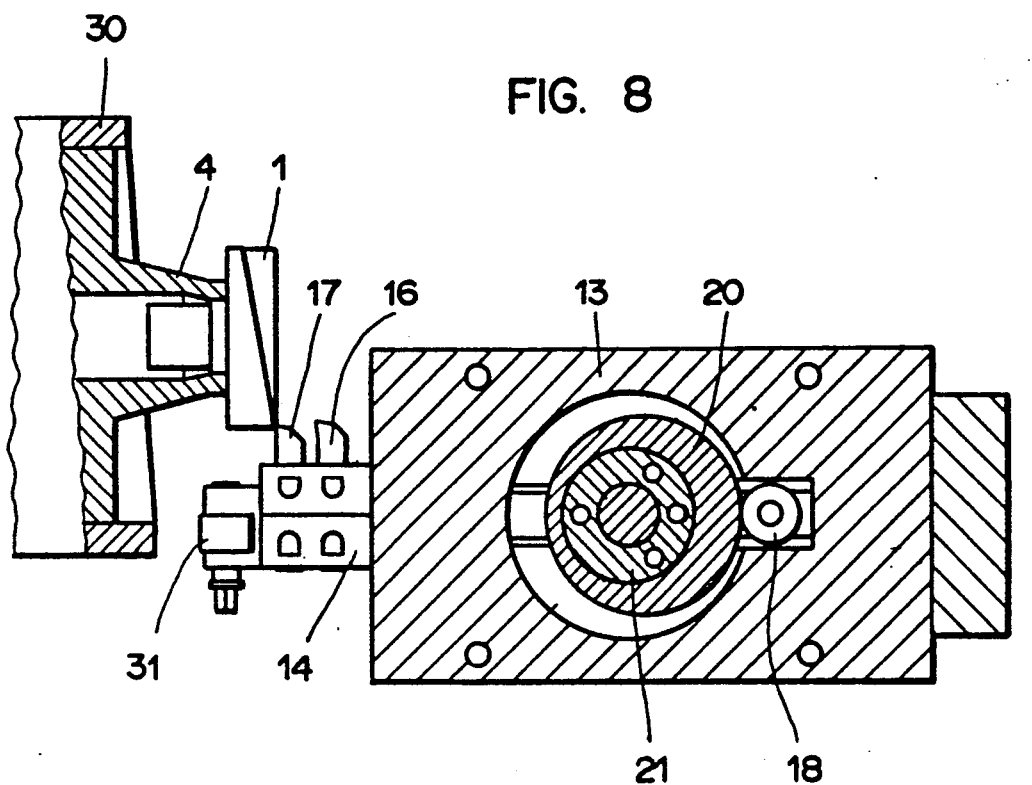
Figure 9:
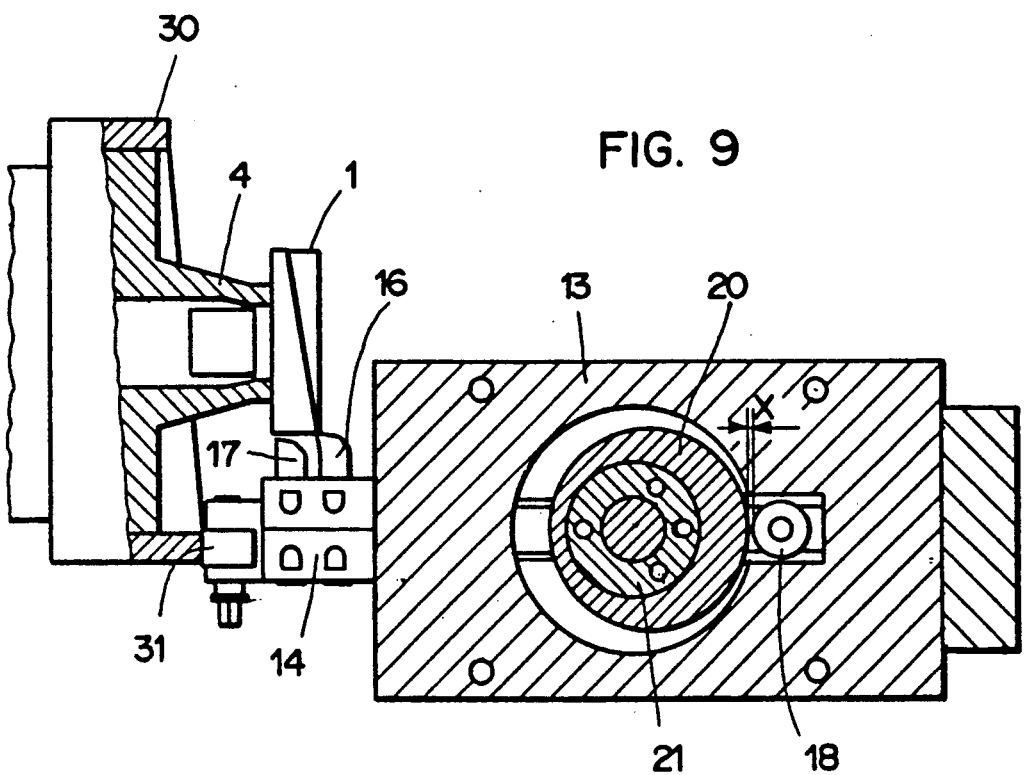

FIG. 1B is a developed view of the profile of a shoulder 1a of an ordinary drum, FIG. 1C is a view similar to that of FIG. 1B showing the profile of a shoulder having high accelerations and decelerations, FIG. 2 is a diagrammatic top plan view of a turning machine equipped with the preferred embodiment of the apparatus, given by way of example, FIG. 3 is a top plan view of the apparatus, FIG. 4 is a longitudinal section taken on the line 4—4 of FIG. 3, FIG. 5 is a cross-section taken on the line 5—5 of FIG. 4, FIG. 6 is a cross-section taken on the line 6—6 of FIG. 4, FIG. 7 is a longitudinal section taken on the line 7—7 of FIG. 5, FIG. 8 is a view showing the position of the apparatus during turning of a surface 1d, and FIG. 9 is a view showing the position of the apparatus during finish turning of the shoulder 1a.

The turning machine illustrated in FIGS. 2–9 comprises a headstock 2 in which there is disposed a main spindle 3 equipped with a chuck 4 controlled by a pneumatic cylinder 5. A bell-shaped cam 30 is mounted coaxially with chuck 4 and integrally therewith. The profile of its control surface is an exact reproduction of the profile of a shoulder 1a to be machined in a workpiece 1. Spindle 3 is driven by an electric motor (not shown) connected to spindle 3 by a belt drive including a belt 6 and a pulley 7 integral with spindle 3. A synchronous belt 9 further connects spindle 3 to an incremental shaft encoder 8 which acts as a transmitter of signals for controlling a driving motor 10 of the auxiliary apparatus.

This apparatus is designated as a whole by reference numeral 11. It is fixed on the top plate of a cross-slide support 12 forming part of the machine. It may thus be brought into operating position or into resting position by displacement of device 12. Apparatus 11 includes a base 13 which is fixed to the top plate of device 12. A slide 14 is guide longitudinally in base 13, preferably by hydrostatic means. The oil feed for the hydrostatic support is connected to tapped bores 22, and the oil flows through capillary ducts 24 and bores 23 into oil lodgings 25.

One of the end portions of slide 14, which protrudes out of base 13, bears a revolving roller 31 which acts as a feeler and can co-operate with cam 30. This same end portion of slide 14 comprises two toolholder seats 15 in which two turning cutters 16 and 17 are fixed.

In the vicinity of its other end, slide 14 bears a second revolving roller 18 which acts as a feeler co-operating with a second cam 20.

This second cam 20 is integral with a shaft 21 which is mounted pivotingly in base 13 by means of bearings 26. One of the ends of this shaft is designed as a shaft-hub coupling and connected to the drive shaft 27 of an electric motor 10, likewise mounted on the base 13. In this embodiment, the electric motor is a stepping motor, the number of steps per revolution corresponds to the number of pulses transmitted per revolution by the pulse generator 8, and the speed of rotation of which is determined by this pulse generator associated with spindle 3, with the aid of a control unit. The whole is regulated in such a way that cam 20 rotates in exact synchronization with main spindle 3.

For driving cam 20, it would also be possible to use a rotary-field or DC motor equipped with a pulse-generating rotor which would also drive cam 20 synchronously with the main spindle by means of an appropriate control.

A pin 28 fixed in shaft 21 co-operates with a proximity switch 29 to cut off a current upon each revolution for a precisely determined angular position of shaft 21. Thus a reference signal is transmitted which is repeated upon each revolution of cam 20. Pulse generator 8 likewise gives a reference signal upon each revolution for a precisely determined angular position.

Slide 14 finally co-operates with pressing means 19 made up of one or more springs; and it is seen that according to the position of the apparatus governed by cross-slide device 12, it can be held in place, in the direction of its longitudinal displacement, either by roller 18 resting against cam 20 (FIG. 8) or by roller 31 resting against cam 30 (FIG. 9).

The apparatus described operates in the following manner:

Once coaxial bores 1b and 1c of workpiece 1 have been machined while this workpiece is clamped in chuck 4, apparatus 11 is immediately brought into the active position of FIG. 8 by displacement of device 12. Cam 30 then has no effect, and the control of slide 14 is carried out via cam 20. The speed of rotation of main spindle 3 is brought to a low value by braking, while motor 10 of apparatus II causes cam 20 to rotate to bring it into its reference orientation. When, in this situation, pulse-generating rotor 8 passes through the orientation which gives the reference signal, motor 10 is switched on and starts to turn synchronously with spindle 3 as regards rpm and angular position. The speed of rotation of spindle 3 is then increased up to the value intended for machining. Motor 10 follows this acceleration. Via support 12, the apparatus carries out a hobbing movement in Z direction, and tool 17 first machines the outside lateral surface 1d of drum 1. During this operation, shoulder 1a is likewise rough-machined, for slide 14 to which tool 17 is fixed follows the profile of cam 20 under the influence of springs 19. It therefore reciprocates axially upon each revolution.

This machining can be carried out at high speed, for the profile of cam 20 is continuous, as shown in FIG. 1b, hence does not cause any abrupt jump in acceleration or deceleration. However, the rough-machining precision of shoulder 1a on workpiece 1 is sufficiently precise for it to be able to be subsequently finished by turning in one pass. In addition, during the operation which has just been described, cam 30 is inactive in apparatus 11. Thus, no interfering force liable to disturb the circular turning of the jacket surface 1d of workpiece 1 is exerted upon the bearings of spindle 3.

When machining of surface 1a of workpiece 1 is finished, the rpm of spindle 3 is decreased by braking, and tool 17 is moved away from workpiece 1 by an X displacement of cross-slide 12. Then, this device moves its plate in Z direction and brings auxiliary apparatus 11 into a position corresponding to FIG. 9.

In this situation, tool 16 is in an advanced position relative to tool 17. Cam 30 is then in an active position where it acts upon slide 14 via roller 31 and under the action of springs 19. Between roller 18 and cam 20 there now exists a space "X" so that cam 20 has no effect upon the movements of slide 14.

As cam 30 is an exact replica of the profile to be machined, according to FIG. 1C, final machining of shoulder 1a and of the neighboring zone of surface 1d (FIG. 1A) is carried out in a single turning pass by displacement of the cross-slide in X direction. As soon as this operation is terminated, cross-slide 12 moves and returns to its starting position, which allows the finished workpiece 1 to be unclamped from chuck 4.

Owing to the use of two cams, one of which has a relatively continuous profile and goes into operation for the machining of surface 1d, and the other, fixed on the spindle, is an exact reproduction of shoulder 1a and goes into operation at the time of the end pass, surface 1d can be machined under economical conditions at high speed. Only the final pass of undercut turning for finishing shoulder 1a, which is not of long duration, necessitates a reduced speed of rotation. As cam 30 fixed on the main spindle is not in action relative to apparatus 11 during machining of surface 1d, no additional force liable to disturb the coaxiality of lateral surface 1d is exerted during this time on the bearings of the spindle. In addition, there is no mechanical connection between apparatus 11 and spindle 3. Hence cross-slide 12 can move without hindrance throughout its operating area. For finishing bores 1b and 1c, spindle 3 may be accelerated to more than 6000 rpm. All these elements contribute to the fact that the apparatus described makes it possible efficiently to machine tape drums of video and DAT recording apparatus, the shoulder profiles of which present marked jumps in acceleration or deceleration.

What is claimed is:

1. An auxiliary apparatus for the precision turning of a lateral surface of a workpiece fixed by chucking means in a spindle of a machine having a cross-slide, said apparatus comprising:
   a base fixed on said cross-slide;
   a guided slide movable in a predetermined direction relative to said base;
   means integral with said guided slide for holding a plurality of turning tools;
   spring means disposed in said base for urging said guided slide in said predetermined direction;
   a cam control device including a plurality of cams driven rotatingly synchronously with said spindle, each cam having a guide surface for effecting controlled displacements of said guided slide, each of said tools thus machining a respective portion of said lateral surface;
   means for driving all of said cams synchronously; and
   a plurality of transmission members mounted on said guided slide, each co-operating with a corresponding one of said cams,
   said cams and said transmission members being arranged so that each of said transmission members can be brought successively by displacement of said cross-slide into a bearing position in which each said transmission member rests against said guide surface of the corresponding cam against the action of said spring means for controlling displacement of said guided slide.

2. The apparatus of claim 1 comprising a first cam and a second cam.

3. The apparatus of claim 2, further comprising an auxiliary shaft borne by said base and electric driving means for driving said auxiliary shaft synchronously with said spindle, said first cam being associated with said spindle and said second cam being associated with said auxiliary shaft.

4. The apparatus of claim 3, wherein said second cam is a flat cam, the axis of rotation of said auxiliary shaft being oriented perpendicular to the direction of displacement of said slide.

5. The apparatus of claim 3, wherein said first cam is a bell-type cam integral with said spindle and coaxial therewith.

6. The appartus of claim 1, further comprising hydrostatic support means for guiding said slide in said base in said predetermined direction.

* * * * *